(12) United States Patent
Kahn et al.

(10) Patent No.: US 11,804,038 B1
(45) Date of Patent: Oct. 31, 2023

(54) AERIAL ARRAY SURVEYING OF SURFACES AND SUBSURFACES

(71) Applicant: Amazon Technologies, Inc., Reno, NV (US)

(72) Inventors: Daniel Scott Kahn, Houston, TX (US); Lee Gondorchin, Spring, TX (US)

(73) Assignee: Amazon Technologies, Inc., Reno, NV (US)

( * ) Notice: Subject to any disclaimer, the term of this patent is extended or adjusted under 35 U.S.C. 154(b) by 199 days.

(21) Appl. No.: 17/354,533

(22) Filed: Jun. 22, 2021

(51) Int. Cl.
*G06V 20/10* (2022.01)
*G06T 7/55* (2017.01)
(Continued)

(52) U.S. Cl.
CPC ............ *G06V 20/10* (2022.01); *B64C 39/024* (2013.01); *G06F 18/214* (2023.01); *G06F 18/24* (2023.01); *G06N 3/08* (2013.01); *G06T 7/55* (2017.01); *G06V 10/25* (2022.01); *G06V 20/17* (2022.01); *H04L 67/10* (2013.01); *H04N 5/38* (2013.01); *H04N 23/90* (2023.01); *B64U 10/13* (2023.01); *B64U 2201/20* (2023.01); *G06T 2207/20081* (2013.01); *G06T 2207/20084* (2013.01); *G06T 2207/30204* (2013.01)

(58) Field of Classification Search
CPC ........ G06V 20/10; G06V 10/25; G06V 20/17; G06V 20/176; G06V 20/58; B64C 39/024; G06F 18/214; G06F 18/24; G06N 3/08; G06T 7/55; G06T 2207/20081; G06T 2207/20084; G06T 2207/30204; H04L 67/10; H04N 5/38; H04N 23/90; H04N 23/60; H04N 23/695; H04N 13/296; H04N 2013/0081; H04N 23/62; B64U 10/13; B64U 2201/20; B64U 2101/30; G05D 1/0094; G05D 1/0027; B64D 47/08
See application file for complete search history.

(56) References Cited

U.S. PATENT DOCUMENTS

2019/0094149 A1* 3/2019 Troy .................. G01S 17/87
2019/0172348 A1* 6/2019 Rivers ................ G08G 5/006
(Continued)

OTHER PUBLICATIONS

"Mini-Unmanned Aerial Vehicle-Based Remote Sensing: Techniques, applications, and prospects"; Tian-Zhu Xiang, IEEE Geoscience and Remote Sensing Magazine (vol. 7, Issue: 3, pp. 29-63), Sep. 23, 2019 (Year: 2019).*

*Primary Examiner* — Michael S Osinski
(74) *Attorney, Agent, or Firm* — HOGAN LOVELLS US LLP

(57) ABSTRACT

Two or more aerial vehicles, such as drones, can each include one or more cameras for capturing surveying or other image data within a field of view. Some of the image data, as well as other data, can be stored and pre-processed on the vehicles, including via onboard edge computing devices. The image and/or other data can be analyzed by a remote system or service, which has additional computing resources, and used to determine the occurrence or existence of an anomaly, such as a seismic event or structure identified in the field of view. The anomaly determination may be based on a disparity, involving a distance between cameras, the cameras' focal length, and a perpendicular distance from a point between cameras to a surface or subsurface point.

20 Claims, 6 Drawing Sheets

(51) Int. Cl.
  *H04N 5/38*    (2006.01)
  *G06N 3/08*    (2023.01)
  *B64C 39/02*   (2023.01)
  *H04L 67/10*   (2022.01)
  *G06V 10/25*   (2022.01)
  *G06F 18/24*   (2023.01)
  *G06F 18/214*  (2023.01)
  *H04N 23/90*   (2023.01)
  *G06V 20/17*   (2022.01)
  *B64U 10/13*   (2023.01)

(56) References Cited

U.S. PATENT DOCUMENTS

| | | | |
|---|---|---|---|
| 2020/0160030 A1* | 5/2020 | Lavi | G06T 7/75 |
| 2020/0195847 A1* | 6/2020 | Zheng | G06F 18/22 |
| 2020/0234043 A1* | 7/2020 | Shue | G06V 20/176 |
| 2020/0241568 A1* | 7/2020 | Peters | G05D 1/101 |
| 2021/0109312 A1* | 4/2021 | Honjo | G03B 15/006 |
| 2021/0237276 A1* | 8/2021 | Shah | B25J 13/006 |
| 2021/0356255 A1* | 11/2021 | Sweers | G01B 11/303 |
| 2022/0033073 A1* | 2/2022 | Seydoux Fornier de Clausonne | G01S 13/933 |
| 2022/0108163 A1* | 4/2022 | Sokhandan Asl | G06V 10/7753 |
| 2022/0187828 A1* | 6/2022 | Miyagawa | G05D 1/0094 |
| 2022/0283584 A1* | 9/2022 | Toyoshi | H04N 23/62 |
| 2022/0301302 A1* | 9/2022 | Murphy | G05D 1/0044 |
| 2022/0303468 A1* | 9/2022 | Murakami | G06T 7/73 |
| 2022/0345631 A1* | 10/2022 | Qu | H04N 23/631 |
| 2022/0414927 A1* | 12/2022 | Ricke | G06T 7/579 |
| 2023/0077169 A1* | 3/2023 | Tsurumi | H04N 13/296 |
| 2023/0077398 A1* | 3/2023 | Yamada | G06T 7/285 |
| 2023/0078625 A1* | 3/2023 | Kaehler | B25J 9/163 700/245 |

* cited by examiner

US 11,804,038 B1

AERIAL ARRAY SURVEYING OF SURFACES AND SUBSURFACES

BACKGROUND

The need to survey terrain surfaces and subsurfaces has existed for many years and remains incredibly important. By way of but one critical example, knowledge of the subsurface holds the key to finding the most productive regions to explore for energy reserves. Three-dimensional ("3-D") and/or temporal four-dimensional ("4-D") seismic data is the optimal tool in understanding the surfaces and subsurfaces. Standard procedures often require placement of thousands of individual acoustic sensors, known as geophones, on the surface while active sources from vibrator trucks are made on the ground. The timing of the reception of the acoustic signals at the sensors, coupled with the knowledge of the location and time of the shots, can lead to a 3-D velocity map of the subsurface. This stratigraphic map can be interpreted to yield potentially-productive areas in which to drill for energy.

As may be seen then, the existing approaches to conducting surface and subsurface surveying, and thus acquiring such data, suffer greatly from various concerns and problems. Among other things, those approaches are: expensive, requiring a significant investment of time and money, including outlays for specialized equipment; prone to accidents, as a survey site must be monitored and controlled, thereby exposing a number of people to potential injury; time-consuming, requiring daylight and continuing for several weeks or months; and physically burdensome, because copious geophones as well as certain heavy machinery (e.g., one or more vibrator trucks) are placed strategically and land entry approvals are needed, with the potential for private property damage arising. Compounding matters is the problem that network connectivity, vitally important for work in the present day, is often limited. Moreover, it can take weeks or months to transport the large amount of data to the surveying entities (e.g., energy companies) and then to other networks. These delays keep surveying entities from making anywhere near real-time decisions and can cost productivity while operations wait for instructions. There thus arises a need for systems and methods which can rapidly survey surfaces and subsurfaces, while increasing connectivity and safety and reducing expenses, operation time, and the burdens of large equipment or physical entry.

BRIEF DESCRIPTION OF THE DRAWINGS

Various embodiments in accordance with the present disclosure will be described with reference to the drawings which are described as follows.

DETAILED DESCRIPTION

Systems and methods in accordance with various embodiments of the present disclosure may overcome one or more of the aforementioned and other deficiencies experienced in conventional approaches to surveying surfaces and subsurfaces. In particular, various embodiments provide mechanisms and methods that use an interconnected array or fleet of at least two aerial devices for capturing image data, upon which an analysis of the surface and/or subsurface of regions of Earth (or even non-terrestrial objects) is made. In some illustrative embodiments, one or more of the aerial devices in the array are equipped with an onboard computing device to handle tasks such as pre-processing and/or streaming of data. Ultimately, a linear two-dimensional ("2-D") seismic image, a 3-D volume-type image, and/or a 4-D type-based volume image can be produced, none of which can be generated using only a single airborne vehicle. Among other things, the embodiments will prove considerably more feasible from both a time and financial investment perspective, as the human element and heavy machinery are not necessarily required. Various other functions and advantages are described and suggested below as may be provided in accordance with the various embodiments.

The aerial devices contemplated by the present disclosure include any number of airborne device capable of hovering, including, but not limited to, airplanes, balloons, blimps, drones or unmanned aerial vehicles ("UAVs"), remotely piloted aircraft, helicopters, rovers, or satellites. While the term "drone" is employed herein solely for convenience, it is intentionally open-ended and should be broadly construed to cover any airborne, seafaring, or spacefaring vehicle or object. Similarly, the term "surface" is used representatively and to be construed broadly, to encompass surfaces and subsurfaces on land or water, on Earth or beyond this planet.

Figure 1:
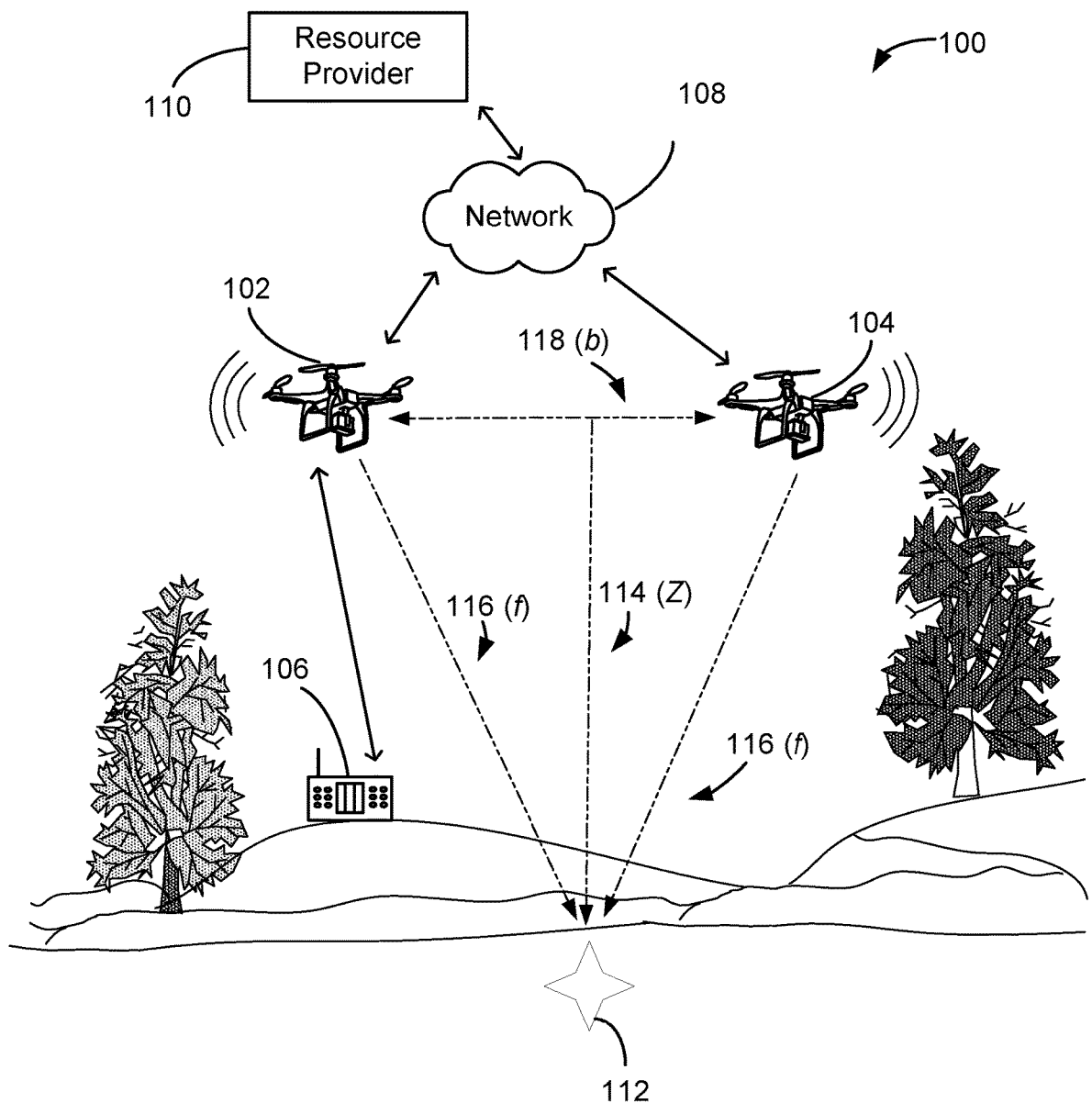
FIG. 1 illustrates an example environment in which various embodiments of the present invention can be practiced.

One illustrative application and example environment of interest 100 is illustrated in FIG. 1. In this example, two drones 102, 104 are each able to capture image data to be processed onboard and/or by resources of a provider of cloud computing services. The drones 102, 104 may be of the same or different types, operated by the same or different entities, and provide similar or different types of information from similar or different areas of interest, such as a surface or subsurface to be surveyed. As will be discussed in more detail, each drone can communicate wirelessly with one or more base stations or controllers 106, which can cause information to be transmitted across at least one network 108 to be received by a resource provider environment 110, potentially at an interface layer. Alternatively, the information may be submitted to the provider environment 110 in the form of a portable computing device onboard the drones 102, 104. The network 108 can be any appropriate network, such as one or more wired or wireless networks, as may include a cellular network, the internet, an intranet, a local area network ("LAN"), and the like. The data transmitted can include any appropriate data discussed or suggested herein, as may include image data, position data, sensor data, identifier data, object description data, and the like. The drones 102, 104 can be configured to concurrently capture image data representing different views of one or more areas or objects of interest 112. The data can be time synchronized such that the corresponding views can be correlated, enabling more accurate determinations and interpretations of the imaged subject.

The process by which certain measurements and analyses hereunder are made relies on a stereoscopic vision variable referred to herein as the "disparity." Viewed from at least two different aerial device 102, 104 points, the locations of the drone-mounted cameras, a given image will appear differently. The disparity (d) of the images is related to the perpendicular distance 114 from the cameras to the point of interest 112 on the surface of the ground (Z), the focal length of the camera (f) 116, and the separation of the cameras (b) 118, in some embodiments through the formula d=fb/Z. The ability to obtain two different views from determinable viewpoints enables the capturing of stereoscopic image data, whereby the disparity provides information about distance and scale. Using cameras on different drones, it is possible to increase b, and thus d. Additionally, the focal length (f) can differ from one drone to another. In some embodiments, monoscopic (i.e., one camera onboard each drone in the array) vision is used to maximize disparity, d, thereby increasing resolution and analytic accuracy. As the specified location moves or vibrates, the disparity between images will change. Subject to processing capabilities and specifics of a given situation (particularly if interferometry techniques are also employed as part of the survey), additional parameters and/or variables can factor into this disparity equation.

If, using sensors such as position sensors, geographic sensors, altimeters, proximity sensors, and/or other such sensors, the drones 102, 104 are able to determine their relative positions, the data captured by each camera can be correlated to provide disparity information that varies with distance. By knowing the optical properties of the camera assemblies and relative positions, the disparity data can be used to obtain distance and dimension data for surfaces, subsurfaces, and objects in the imaged scene. Dimension data can help to increase the confidence in identifications and analyses. Various other features can be used to improve confidence in other embodiments as well, such as color analysis and the like. Other sensors that are capable of identifying heat signatures or other data indicative of a human object can be used to increase confidence as well within the scope of various embodiments. Such will additionally assist with geothermal-oriented projects.

Since, in some embodiments relating to seismic surveying, the area of interest 112 may generally move over a period of time, such an area can be identified based at least in part upon its seismic movement. Any area of interest 112 may very well include stationary objects. The objects that generally do not move over time can be considered background objects, such that these objects can be discerned from surfaces, subsurfaces, or other objects of interest 112. The ability to detect objects or occurrences such as inclement weather and fires can also help to avoid damage to the drones 102, 104 and other such issues.

Figure 2:
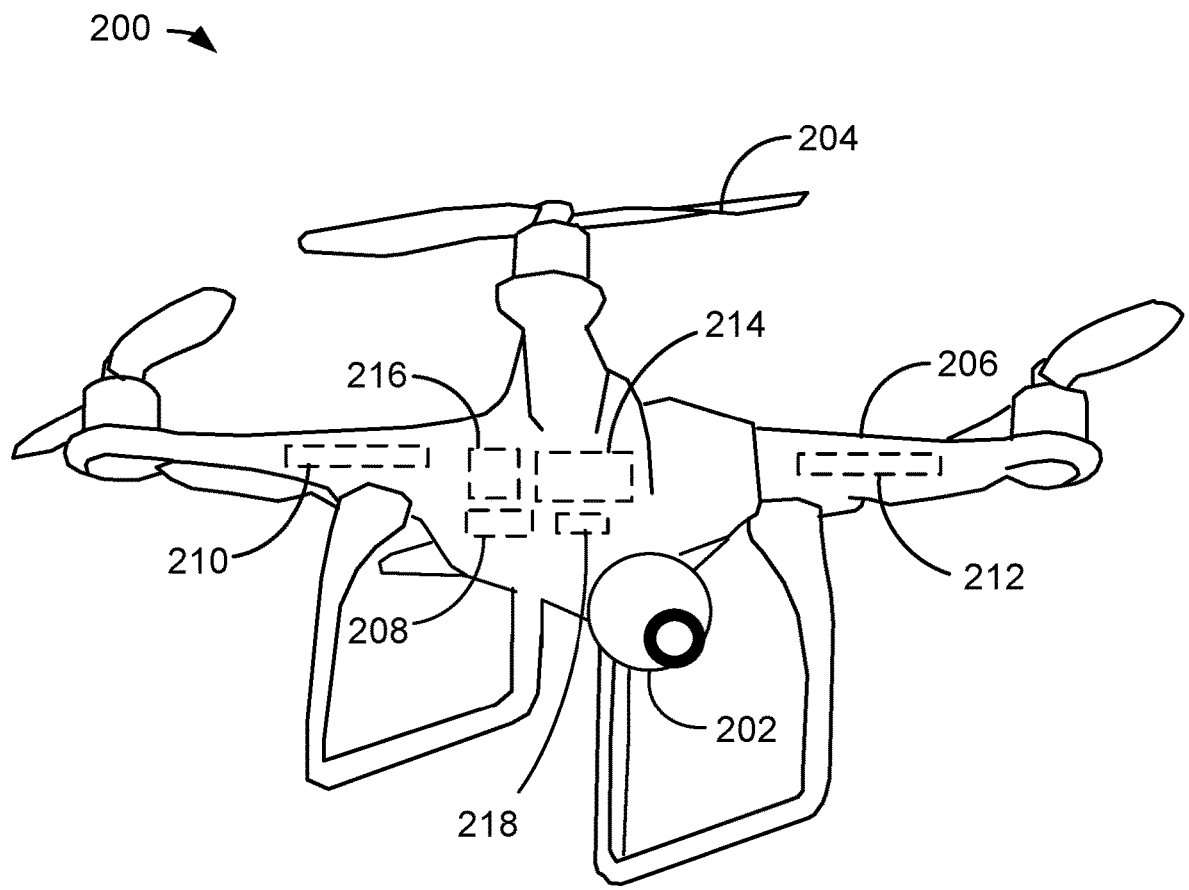
FIG. 2 illustrates an example aerial vehicle, and certain components thereof, which can be utilized in accordance with various embodiments.

As noted, various embodiments use an array of at least two drones. An example of such a drone 200 is illustrated in FIG. 2. The drone 200 can include various cameras, sensors, and other components that enable the drone 200 to capture image data within a capture range and transmit the relevant data. Each drone 200 will carry a minimum of one camera 202 which can be focused on a specific surface location (e.g., as shown by reference number 112 in FIG. 1) and potentially capable of producing a subsurface imaging trace. More particularly, the drones 200 in some embodiments are equipped with stereoscopic video and/or still-image camera systems 202 and drone-mounted (externally or internally) edge computing and storage devices 204, to monitor motion of the ground, any other surface, or a subsurface, even on and below the surface of bodies of water (in the final case, involving one or more submerged drones).

The cameras 202 onboard the drones 200 in a given array each can, but need not be, stereoscopic and can be any appropriate camera, as may include a complementary metal-oxide-semiconductor ("CMOS"), charge coupled device ("CCD"), or other such sensor or detector capable of capturing light energy over a determined spectrum, as may include portions of the visible, infrared, and/or ultraviolet spectrum. Each camera 202 may be part of an assembly that includes appropriate optics, lenses, focusing elements, shutters, and other such elements for image capture by a single camera, set of cameras, a stereoscopic camera, or other such configuration. The cameras 202 can be configured to perform tasks such as autofocusing, zoom (optical or digital), brightness and color adjustments, and the like. Subject to drone weight restrictions and the desired level of optimization, it is possible to mount as many cameras 202 as possible on each drone 200.

In this example of FIG. 2, the drone 200 is a multi-rotor, fixed-pitch aircraft, such as a quadcopter with four separate motors and rotors 204, although fixed wing designs with launch mechanisms and other types of aircraft can be used as well within the scope of the various embodiments. The motor(s) can be any appropriate motor used for such aircraft, as may include brushless motors for smaller drones to more conventional aircraft motors for larger aircraft. There can be various other drive mechanisms, control systems, balancing components, or other elements used with such systems. This example drone 200 has a housing 206 made out of a lightweight material such as a polymer, fiberglass, or carbon fiber material, although various other materials can be utilized as well, providing strength and durability while adding as little weight as possible. The drone 200 may include at least some amount of memory 208 for storing at least a portion of the image data, at least temporarily on the drone 200. The data can be stored at least until such time as one or more processors 210 of the drone are able to analyze at least a portion of the data and/or at least a portion of the data is able to be communicated, via a wireless communication device 212, or otherwise provided to a base station or remote system or server for analysis, as reflected in FIG. 1. The memory 208 can include any appropriate memory, or combination thereof, as may include flash memory or another such non-transitory, non-volatile computer-readable storage medium. The memory 208 and/or data storage on the drone 200 may also include devices such as memory cards, USB flash drives, solid state drives, random access memory ("RAM"), optical drives, magnetic drives, and the like.

The drone's method of flight and types of engines, flight mechanisms, and launch mechanisms are not critical to at least some of the embodiments, as many embodiments instead rely only on the drone 200 having the ability to maneuver to a determined location as may be determined by an appropriate flight control system. While the drone 200 can be guided by remote control in some embodiments, in other embodiments, the drone 200 is controlled autonomously by an onboard computer and/or control system. In this vein, the drone 200 also includes one or more motion and/or orientation sensors 214. These can include, for example, gyroscopes, electronic compasses, inertial sensors, accelerometers, magnetometers, and the like. These sensors 214 can be used to determine motion of the drone 200, which can help provide feedback to a control system as well as to provide information to the processor(s) 210 about changes in location and orientation of the drone 200; the location and orientation information can, in turn, be used to remove, or account for, apparent motion in the image data as a result of motion of the drone 200.

The camera 202 may include image stabilization components and/or software, to account for small vibrations, shaking, or variation in point of view. By knowing changes in orientation and position from the appropriate sensor(s) 214, changes in position of surfaces and/or objects in the image data can be accounted for when those changes are due to motion of the drone 200. This can help to determine background regions, for example, where a background separation process relies on background that does not significantly change over time, but, due to motion of the drone 200, the background would change in the captured image data. The ability to subtract out the effects of the motion, for example, can enable the background image data to be identified as not moving over time. As an example, if the drone 200 translates in one direction that would cause a ten pixel shift a first direction in the image data, the position information in the image data can be shifted by ten pixels in the other direction to account for the movement. A similar effect would be experienced with rotation, where the angular change would affect the image data by a determined angular extent. If the approximate distance to the point or area of interest is known, such as from an altimeter or other such component, then the image data can be compensated accordingly. Various other motion adjustments can be performed on the image data, as would be apparent to one of ordinary skill in the art, in light of the teachings and suggestions contained herein.

In the interest of improving observational and analytical accuracy, among other reasons, a secondary (i.e., in addition to, or in place of, the cameras 202) data acquisition means can be employed on the drone 200. Such can include light and/or acoustic wave applications, with interferometry wave measurement employed. The measurements may include those of certain characteristics of the waves themselves and the materials with which the waves interact. For example, a laser can be attached to each drone 202 and used for surface targeting, as well as ensuring precise arrangement of the drones in a given array. Surface targeting may come in the form of a set of laser dots or markers, with movement thereof monitored in the interest of improving surveying accuracy, including on a high-resolution level; such is considerably easier than attempting to locate an existing target on the ground, such as a surface crack or fissure.

The drone 200 can include other components as well, such as one or more rechargeable batteries 216 or other such power sources, as may receive power from solar, wireless, or other such sources while in flight. The drone 200 can also include a proximity sensor 218, ultrasonic sensor, or other sensor capable of detecting the proximity or location of objects to assist in crash avoidance. While the drone 200 can be equipped with a collision avoidance system and other such components, the drone 200 can also be configured to fly based upon fields of view of its onboard camera(s), such that a maximum amount of unique data can be obtained from the entire array. Other approaches can be used as well, such as to cause drones to capture overlapping or redundant data for purposes of improving accuracy and precision, etc. As mentioned elsewhere herein, the different views can also be utilized to obtain multi-dimensional data and/or multiple views of areas and objects of interest. Other components can be used as well, such as may include autopilot systems, airspeed sensors, propeller balancers, crash support elements, and the like.

In some embodiments a drone 200 can be received by a docking station, which can be a docking station of the resource provider environment. In the docking station, the drone 200 can recharge its batteries 216 and have any appropriate maintenance or other such service performed. The drone 200 also can connect to the docking station in order to transmit data to and from a data analyzer, data store, database, or other such location. In some embodiments, the drone 200 will upload all its image and sensor data to a resource provider environment over a wired data connection of the docking station. The drone 200 can also receive data, such as new configuration data, trained models, flight paths, and the like. As mentioned herein, the drone 200 and back-end systems can work together to provide various data determinations using image and/or sensor data captured from one or more cameras 202. The drone 200 also can have various other tasks performed while in a docking station, such as may include data removal, virus scanning, software updating, and the like.

Again, in order to operate the drone 200, the processor(s) 210 can work with a flight control system charged with determining the direction of flight for the drone 200 and sending the appropriate signals to the motor(s) for the rotors 204 or other flight mechanism in order to cause the drone to move in the desired direction. The control system can utilize flight path data stored in memory 208, as well as dynamic decisions made by the processor(s) 210 or instructions received over the wireless communication device 212, among other such options.

When capturing image data as part of a surveying or monitoring process, for example, one or more drones 200 can be configured to hover over an area of interest, or follow a regular flight path over, or around, the area of interest. Depending upon the type of area being observed, as well as other factors such as regulatory requirements and/or the size of the drone, there might be a specific height or distance that the drone 200 has to maintain within the area, such as a height between 100 and 200 feet, or 200 and 400 feet, although heights may vary by location and jurisdiction, etc. It may then be important for at least some applications that the drone 200 be able to maneuver to an optimal location, or at least an appropriate location, from which to capture image data for various occurrences or objects.

In certain illustrative embodiments, the image data is in the form of captured imagery including one or more views of the area of interest. As used herein, image data can refer to any of various types of data, as may include one or more still images, video data, video frames or key frames, panoramic images, and stereoscopic image data, among other such options. Further, while environments such as surface land are provided as examples, it should be understood that virtually any area, including those underwater or extraterrestrial, can be utilized within the scope of the various embodiments. Differences in images of a monitored source over a period of time, knowing the type of source (e.g., land at ground level, land subsurface, or below water), can be used to construct, using image processing techniques, a trace image from the lowest depth for which image data is obtained. Image processing and other enhancements can refine specific targets, be they volcanic, mineral deposits, etc. Machine learning networks and techniques, including those discussed herein, can recognize patterns and anomalies in near real-time in some embodiments.

Subsequent or additional image data may be available for comparison, assisting with removal (as discussed herein) of background objects, in order to leave remaining those portions of the image data corresponding to foreground objects and/or any other object(s) of interest. As mentioned, the background generally will remain stationary in the captured image data. Further, as the resolution of cameras continues to increase, the accuracy of anomaly and object recognition will increase. In addition to image data, heat signature data can be captured and analyzed concurrently in order to attempt to improve the confidence in certain determinations.

Figure 3:
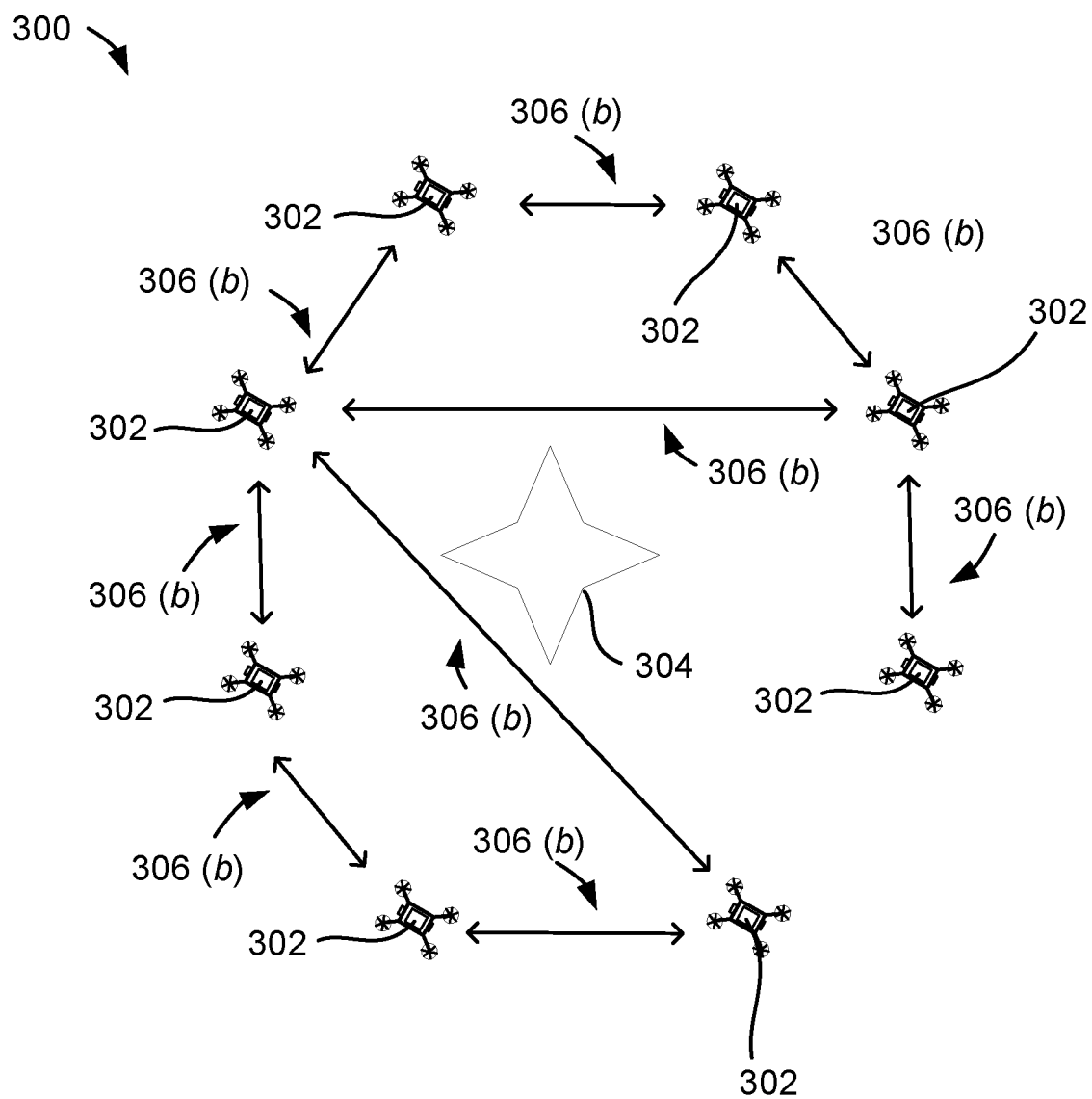
FIG. 3 illustrates an overhead view of an example formation of an array or fleet of aerial vehicles which can be utilized in accordance with various embodiments.

An array of multiple drones focusing on the same surface location yields improved imaging precision and analysis. Unlike physical geophones placed in a specific layout in the ground, it will be easy for surveyors to change any aerial formation of the array of drones. The possible aerial formations are many in number, and need not be symmetrical or in any sort of recognizable shape, but a sample layout or formation 300 is depicted in the overhead view of FIG. 3. Here, eight drones 302 are positioned in a generally octagonal formation, hovering in the vicinity of an area of interest 304. The drones 302 may be communicatively coupled with one or more other drones in the array and/or an operator. Each drone 302 can have its position determined through the Global Positioning System ("GPS"), the Galileo global navigation satellite positioning system ("GNSS"), Inertial Measurement Unit sensors, or any sort of positioning protocol, with, among other variables, the positioning considered in regard to the other drones 302 in the array. As noted, drone-mounted lasers can assist in precisely arranging the formation 300, with one or more measuring lasers on each drone aimed at one or more of the other drones in the array to assist in determining distance between the drones 302.

Various aerial formations of the array will have advantages, including those known to those in the surveying field who are familiar with geophone placement on the ground. The width or aerial spacing 306 of the drones in the formation 300 will vary, depending on notions such as the size of the target area being surveyed and/or the subsurface depth needed to penetrate. When considering an array formation 200, the higher the Z value (camera distance from the subject surface or subsurface), appropriate adjustments or compensations can be made to the b value (and vice versa for a known b value when attempting to determine a desired Z). The formation 300 of the array may depend, at least in part, on timing. Through this process, a time-dependent change in relative position of the subject surface or subsurface can be identified and measured. Such protocol-based and monitored positioning allows for motion of the drone to be canceled or otherwise disregarded. Depending on the purpose of the observation, the movement may be on the order of microns to meters and may take place over milliseconds (or less) or even days. In some embodiments, two or more drones can perform a statistical survey, where a higher flying drone can calibrate the lower flying drone's performance for greater precision. The formation 300 of the array can further be optimized algorithmically, including via machine learning techniques addressed herein.

In illustrative embodiments involving mapping from water surfaces (to account for light diffraction) or extraterrestrial mapping, a "mother ship" type of array formation may be used, where one or more modular drones are positioned around, near, or otherwise within communication reach of a controlling central hub. The central hub could be a drone used for, in accordance with techniques such as those herein, computation, storage, and/or coordination of the positions of one or more drones in the array. A "hub-and-spoke" arrangement may be used in certain embodiments, in particular where a controller drone serves as the "mother ship."

Users are strongly advised to carefully follow all applicable laws and regulations with regard to drone 302 operation and aerial positioning, including, but not limited to, the United States Federal Aviation Administration's regulation stipulating that the maximum allowable drone altitude is four hundred (400) feet above the ground (higher if a drone remains within four hundred (400) feet of a structure). Obviously, the applicable laws and regulations will differ if the utilized aerial vehicles are, say, orbiting satellites.

As noted, neural network, deep learning, and other machine learning techniques have many applications for present purposes. As is known in the neural network and artificial intelligence arts, a variety of neural network types could be applied, including, but by no means limited to, feedforward, recurrent, radial basis function, modular, and self-organizing neural networks. Prior to production environment use, a non-production sample data set of typical survey image content may be employed for training a neural network model for processing subject content. Although graphics processing units ("GPUs") are effective for many deep learning neural network applications, the present systems and methods can be used with GPU-based or central processing unit ("CPU")-based systems.

More particularly, with the emergence of the deep convolutional neural network ("CNN"), a programming and information processing paradigm allowing a machine to learn from data, object detection performance has improved significantly. CNNs are a family of statistical learning models used in machine learning applications to estimate or approximate functions which depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer, which along with a set of adjacent layers, forms the convolution portion of the network. The bottom layer of the convolution layer, along with a lower layer and an output layer, makes up the fully-connected portion of the network. A number of output values can be determined from the output layer, which can include several items determined to be related to an input item, among other such options.

In some embodiments, a drone can be configured to monitor a certain location or type of location. This monitoring can include determining the presence and locations of objects. Further, there can be many situations where, as part of surveying projects, it may be desirable to locate areas and objects of interest, such as to determine directions and patterns of motion, density, behavior, and other such information, including deviations from standard or observed behavior. Various machine learning approaches can be used for purposes of foreground anomaly detection and/or object subtraction within the scope of the various embodiments. Approaches in accordance with various embodiments utilize at least some amount of object recognition and analysis (potentially on the drones themselves) in order to determine changes in position that can assist in both preparing to capture image data as well as the capturing itself. This can include processes such as foreground detection and relatively simple object recognition in order to identify information such as density of objects, object movement, etc.

One or more drones in a given surveying array might have relatively limited processing and/or memory capacity, such that running a computer vision algorithm on full resolution, full color video data may not be possible, or may not be able to be performed with sufficient frequency for at least some applications. It is also quite possible that the bandwidth required might exceed the available connection capacity, or a sufficient connection might not be able to be reliably and consistently obtained, among other potential issues. Further, if the analyzed data is to be used to help guide the drone to specific locations, then the latency involved in transmitting and receiving the data may be too great to be useful in various situations. Therefore, it can be desirable to minimize the amount of processing that is to be performed on the drone itself. One way to minimize the amount of processing to be performed on the drone (or a base station associated with the drone, operations spread across a group of drones, etc.) is to remove, subtract out, or otherwise be able to ignore portions of the image data corresponding to background objects or regions. The video or image data can then be transmitted to a remote system or service with sufficient processing, memory, and other resource capacity for performing computer vision and object recognition, using models developed via machine learning.

Trained models will be able to, in some embodiments, "clean" the survey data by identifying a signal, such as a seismic signal, and separating it from so-called noise data also reaching a drone in the array. For example, some amount of image pre-processing can be performed for purposes of improving the quality of the images from the drone cameras, as may include filtering out noise, adjusting brightness or contrast, etc. In cases where a drone camera is (or might be) moving, some amount of position or motion compensation may be performed as well. Background subtraction approaches that can be utilized with various embodiments include mean filtering, frame differencing, Gaussian average processing, background mixture modeling, mixture of Gaussians ("MoG") subtraction, and the like. Libraries such as the OPEN CV library can also be utilized to take advantage of the conventional foreground and background segmentation algorithm.

Imaged areas of interest can be processed using a computer vision algorithm for object recognition or other such process. Object recognition typically makes use of one or more classifiers which have been trained to recognize specific types of categories of objects, such as people, structures, and the like. Algorithms used for such purposes can include convolutional or other deep neural networks ("DNNs"), and they may utilize one or more feature extraction libraries for identifying types of feature points of various objects. In some embodiments, a histogram or oriented gradients ("HOG")-based approach uses feature descriptors for object detection, such as by counting occurrences of gradient orientation in localized portions of the image data. Other approaches that can be used take advantage of features such as edge orientation histograms, shape contexts, and scale-invariant feature transform descriptors, although these approaches may not provide the same level of accuracy for at least some data sets.

In some embodiments, an attempt to classify movement and/or objects that does not require precision can rely on general shapes of blobs or regions in the area of interest. Certain classifiers might provide multiple confidence or certainty values, based upon the correspondence of the shape to the range of possible shapes for each type of object, which in some embodiments can include different angles, among other such options. For situations where objects are visible over time, such that additional views and/or image data can be obtained, the image data for various portions of a given blob can be aggregated, averaged, or otherwise processed in order to attempt to improve precision and confidence. As mentioned herein, the ability to obtain views from two or more different drone cameras will improve confidence of the object recognition processes.

If an object, including target areas and fault lines, is not identified with at least a minimum level of confidence, that object can be removed from consideration, or a drone or other device can attempt to obtain additional data in order to attempt to determine the type of object with higher confidence. In some embodiments the image data can be saved onboard a drone for subsequent analysis by a computer system or service with sufficient processing, memory, and other resource capacity to perform a more robust analysis. In this way, the less resource intensive process can be used on the drone for a quick, relatively accurate determination, such as may be useful for determining a flight path for the drone, while a more robust processing can be performed by cloud servers or other such computing resources in order to determine a more accurate analysis of movement and objects of potential interest, in at least some embodiments.

Through image processing (for example, disparity and detailed analysis, using, but not limited to, machine learning, neural networks, and other artificial intelligence techniques), the motion of the surface or a subsurface can be determined. The present systems and methods are capable of detecting even sub-millimeter ground displacement. The determined motion over a region of interest, as surveyed by an array of drones, could, for example, then be used to produce a velocity map of the subsurface to identify subsurface structure, monitor seismically active areas in near-real time for earthquakes or volcanic eruptions, identify changes in aquifer content, or identify mineral deposits. Notably, the present systems and methods can monitor the creation of surface fractures via mirco-seismic imaging on fault lines or where carbon capture via fracking is occurring. Conversions to Richter scale and/or moment magnitude values for a subsurface can be determined based on the amplitude of traces returned to the surface, after discounting the amplitude trace loss as a given reflection returns to the surface through layers of resistant material. This will provide a drone-based estimate of an earthquake, including those of a smaller magnitude which might not otherwise be detected. Beneficially, the present surveying systems and methods can serve as a replacement for current acoustic sensing which requires hand placement of seismometers in rough terrain or fiberoptic cable requiring subsurface placement. In both cases, the expense for placement of the seismometers and the time for transferring the data is substantially higher than the drone acquisition and ramp-up time and costs under the present techniques.

Machine learning can also assist in leveling the orientation of drones in a given array, especially important in inclement weather conditions (e.g., windy environments), while discounting motion of all drones in a given array using a positioning protocol. The benefits of an image difference-based approach to surveying include less noise, unlike acoustic sensing which is more sensitive to noise.

The amount of camera data that must be streamed or stored is substantial. So, one or more of the drones in a given array can be equipped with one or more onboard computing components or elements, which facilitate far less cumbersome and far faster transfer of the camera data (which can be too large to stream directly from the drones). The onboard computing element can be portable (e.g., detachable from the drone for shipment or other transfer, such as to a cloud resource service provider), compact, and capable of storing data on the order of several terabytes; it may include one or more processing cores and/or one or more transfer or transmitting elements in some embodiments. The onboard computing element can, in some embodiments, be a device such as Amazon's AWS Snowcone™ edge storage and computing device, while the transmitters can use any number of current or future networks, including 5G internet connectivity and/or other network types mentioned herein.

The onboard computing element in some embodiments can, prior to surveying, be preconfigured with one or more trained models developed through machine learning, including models equipped to recognize and appropriately process anomalies, patterns, objects (including those blocking a camera's field of vision), and the like for particular terrains. The onboard computing element can be configured in some embodiments to perform onboard pre-processing of image and other data, such that a live stream of the surveying efforts can be generated and broadcast. Such immediate processing will assist integrity of survey data and could include automated event notifications to the party conducting a given survey.

The data from the drones, from either storage or streaming devices, can also easily be delivered and uploaded to a resource provider cloud computing platform, saving weeks or months over conventional methods, even in instances where the computing device is removed from a drone and mailed or shipped to a service provider. This will allow rapid processing, including by machine learning-based applications as contemplated herein, and interpretation of surfaces and subsurfaces for decision making at a significant time and cost savings.

Figure 4:
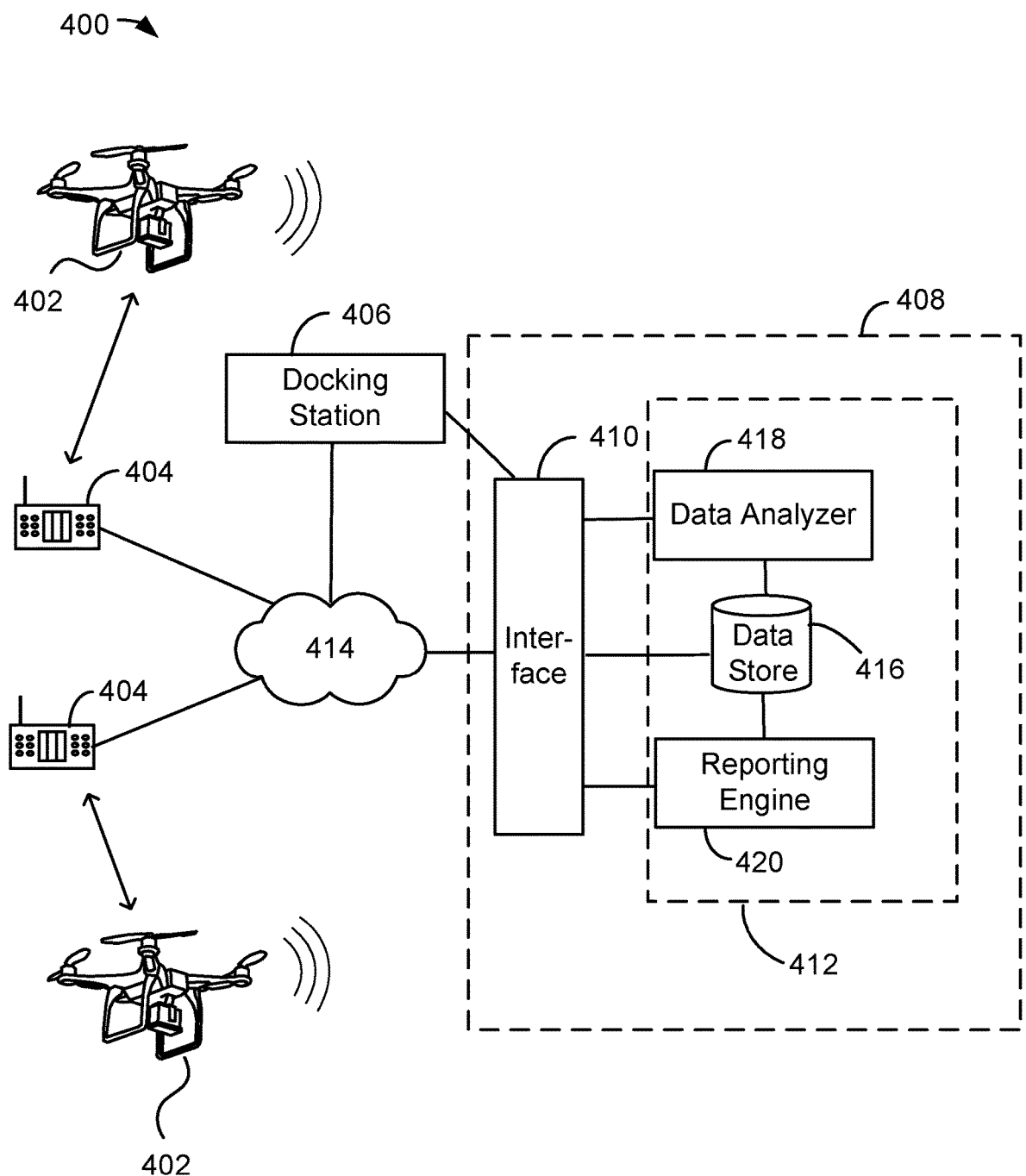
FIG. 4 illustrates an example architecture of systems, components, and devices which can be utilized to implement aspects of the various embodiments.

Various architectures can be used to apply the present systems and methods, including the example architecture 400 shown in FIG. 4. In such an example architecture, two or more camera-equipped drones 402 may capture (and potentially transmit) image data, associated with an area of interest, to a remote system for analysis and object identification, etc. Again, the drones 402 can include additional elements, such as other sensors for capturing data regarding the area of interest, including infrared detectors, thermal sensors, motion sensors, proximity sensors, and other such sensors or components. The drones 402 may also include non-visual based sensors, such as radio or audio receivers, for detecting energy emanating from various objects of interest. These energy sources can include, for example, cell phone signals, voices, vehicle noises, and the like. The overall audio level and direction of the audio can also provide an additional input for potential locations of interest. The drones 402 may include other cameras or sensors as well, as may be used for purposes such as crash avoidance, path determination, and flight control, among other such tasks. At least some of the data from these sensors may be used to attempt to increase accuracy of the imaging and analytical processes. As mentioned herein, the sensors can also include motion and orientation sensors to assist with accounting for apparent movement in the image data due to movement of the applicable camera or drone.

The drones 402 can each communicate wirelessly with operator controllers 404 as well as one or more docking or base stations 406. Flight control software, potentially employed in connection with the controllers 404, might determine the precise or approximate locations of an area of interest, then determine the appropriate flight plan to use to obtain the desired views. Further, in some embodiments, it may be desirable to capture views of objects from multiple angles in order to improve confidence levels. The image data can include one or more images, or video, indicating pixel values for pixel locations of the camera sensor, for example, where the pixel values can represent data such as the intensity or color of ambient, infrared ("IR"), or ultraviolet ("UV") radiation detected by the sensor. The data for processing not only includes image and sensor data, but may also include log data regarding drone location, movement, etc.

As mentioned, in various embodiments there can be at least some of the requisite processing performed on the drones 402, using an onboard computing element, while at least some of the processing can be performed using a remote system or service. In any event, the data can be processed and analyzed, such as by a backend system 408. In some embodiments, this backend processing and analysis can be provided as part of a monitoring service, and the resulting data or analysis of the data can be provided to requesting parties at appropriate times. Potential layers of a backend system 408 are varied and can include layers for interfacing, processing, and machine learning (which can optimize configurations and analyses). An example backend system 408 is capable of receiving data captured by, and relating to, the drones 402 in the array, and it includes a data-receiving interface layer 410, such as an application programming interface ("API"). The interface layer can 410 include any of a number of features and/or components known for receiving and routing information in an environment, as may include various routers, load balancers, network switches, and other such components. Data provided to the interface layer 410 may come directly, via a wired or wireless connection, from the onboard computing element on one or more of the drones 402.

A processing layer 412 can perform data extraction, loading the received data onto the cloud network 414, placing the data into content buckets, manipulating/transforming the data for a given project, and/or storing the buckets in a data store 416 or other such repository for analysis by a data analyzer 418 or other such system, service, module, component, application, or device. Any number of computing services may execute code, with customized logic, in response to events and automatically manage resources. In some embodiments where the data relates to routine monitoring, the data may be analyzed at specific times or intervals. In embodiments where the data relates to specific events or occurrences, or where otherwise indicated by the data or message received from a drone 402, the data analyzer 418 might load the data into resident memory and analyze the data immediately, or as soon as possible. The data analyzer 418 can perform various determinations and analytical tasks discussed and suggested herein, such as to search for patterns and movement, perform more accurate object determinations, and the like. An optimization element or layer could further process the uploaded and/or stored data, possibly handling tasks such as delineating data for retention and data for eventual deletion in the interest of cost savings.

The results of analyses could be stored in the data store 416 or other repository for subsequent retrieval by a component such as a reporting engine 420, which can aggregate the relevant data and generate report data or other such output for provision to the drone operator and/or other relevant parties. For critical data, such as regarding an imminent or ongoing earthquake, the reporting engine 420 might be notified by the data analyzer 418 right away, such that the reporting engine 420 can quickly send a notification to the appropriate entities. Various other reports can be generated as well as would be apparent to one of ordinary skill in the art in light of the teachings and suggestions contained herein. The data can be stored over time for subsequent analysis and comparison, as may be useful in determining trends or patterns that can be based at least in part upon historical behavior data or other such information. Those trends, patterns, and other historical data can be used to train neural networks for seismic imaging, interpretation, and the like. The back-end system 408 can also transmit information about the identified foreground and background regions in order for one or more of the drones to update their training data, or otherwise be able to identify anomalies, objects, background elements, and the like more accurately for purposes of surveying and other aspects discussed herein. On a 5G network or the like, a live data feed may be provided to the surveying party, potentially including livestreaming of imaging and other data.

Figure 5:
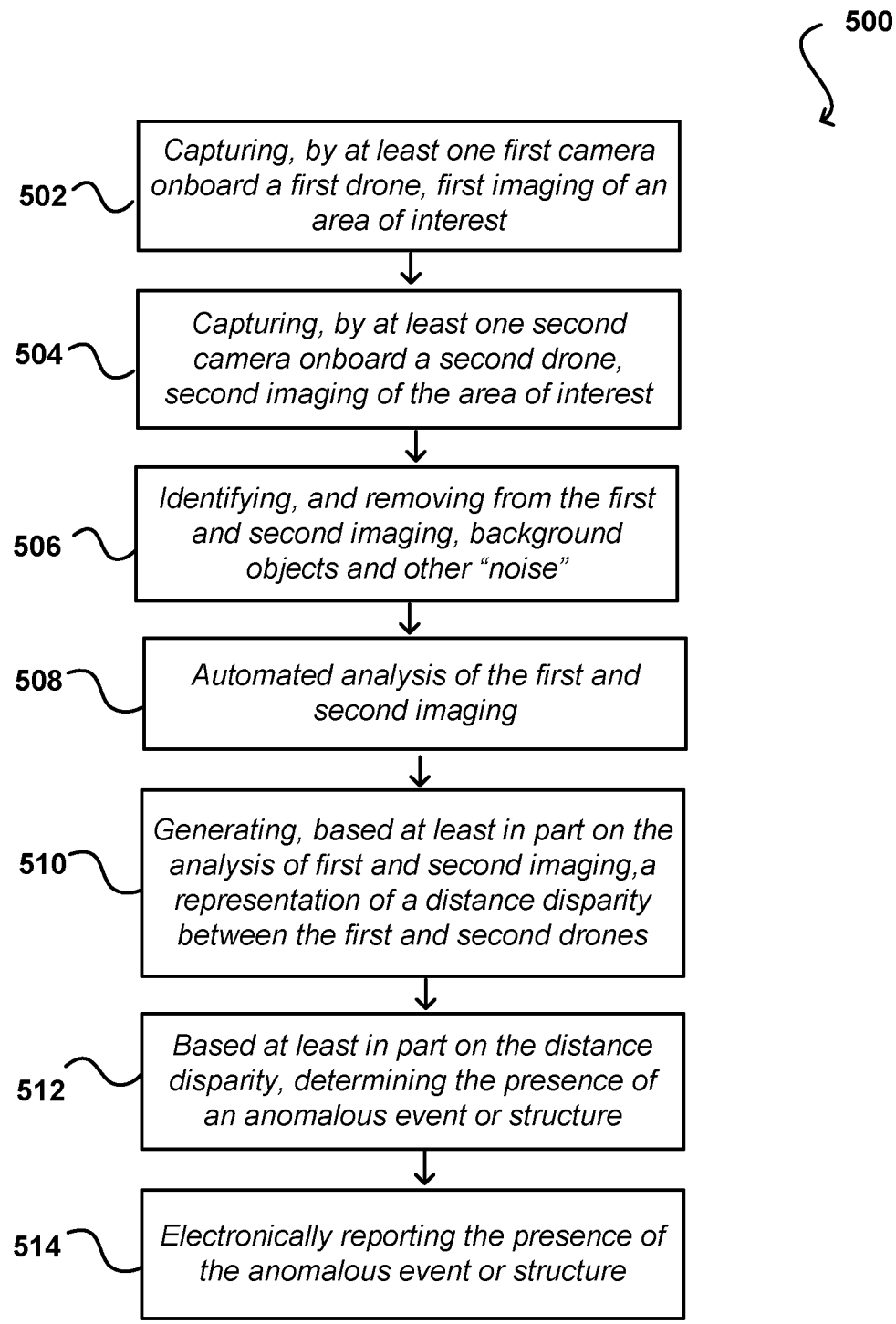
FIG. 5 illustrates steps of an example process flow, in accordance with various embodiments.

FIG. 5 illustrates some representative steps in a process flow 500 utilizing one or more embodiments of the present systems and methods. It should be understood that, for this and other processes discussed herein, there can be additional, fewer, or alternative steps, performed in similar or alternative steps, or in parallel, within the scope of the various embodiments unless otherwise stated. In this example process flow, image data of an area of interest is captured 502, 504 using at least two cameras mounted on two separate drones which are part of (or entirely comprise) an array or fleet. As mentioned, the image data can be stored on the drone and/or provided to a remote system or service for analysis. As part of the analysis, background objects and/or other noise can be determined and removed 506 or otherwise excluded from the surveying process. Motion and/or orientation data from one or more sensors of the drone can be used to account for motion effects in the image data due to motion of the drone during the capture process. If the image data is video data, key frames or other video frames can be selected for analysis, potentially on the capturing drone.

Image data for the focal area of interest can be analyzed 508 by one or more computer vision processes, possibly using one or more classifiers trained on data for particular anomalies of interest, be they seismic events, structures, or something else. Various computer vision and other processes can be used to analyze the image data, and generate determinations, within the scope of the various embodiments. As noted, one or more confidence scores can be calculated as part of the image analyses and related determinations. A minimum confidence threshold can be set in order to cause an anomaly or object of interest to be classified as the type of object determined by the computer vision process. In some embodiments, the drones can be configured to attempt to obtain additional image data or other information (e.g., heat or radio signatures) in order to increase the confidence score to a level that at least meets the threshold or another determination criterion.

In some illustrative embodiments, a first, near-real time analysis can be performed, while a second, more accurate, count can be determined offline that can provide more accurate results, but requires more time and/or computing resource capacity. This can include, for example, one or more automated analyses of at least some of the results with a truth verification process, which can use humans, neural networks, and/or other such approaches to verify that the determinations made were correct. Information about the truthfulness can be used to train the models or update the signatures, features, or patterns, used for motion prediction, object detection, and other such factors, as part of an iterative learning process. Other analysis can be performed on the data as discussed herein, such as may include pattern detection, incident detection, and the like.

A further representative step 510 includes generating, based at least in part on the imaging data from the two or more drones, a representation of a distance disparity (e.g., the calculated d discussed herein) between those drones capturing the image data. Based at least in part on the distance disparity representation, the presence of at least anomaly, such as a seismic event or found structure, in the area of interest may be determined 512. Determinations and analyses based on the image data can be provided 514 to the appropriate party. In some embodiments the results may be stored in a database or other repository for subsequent retrieval.

Figure 6:
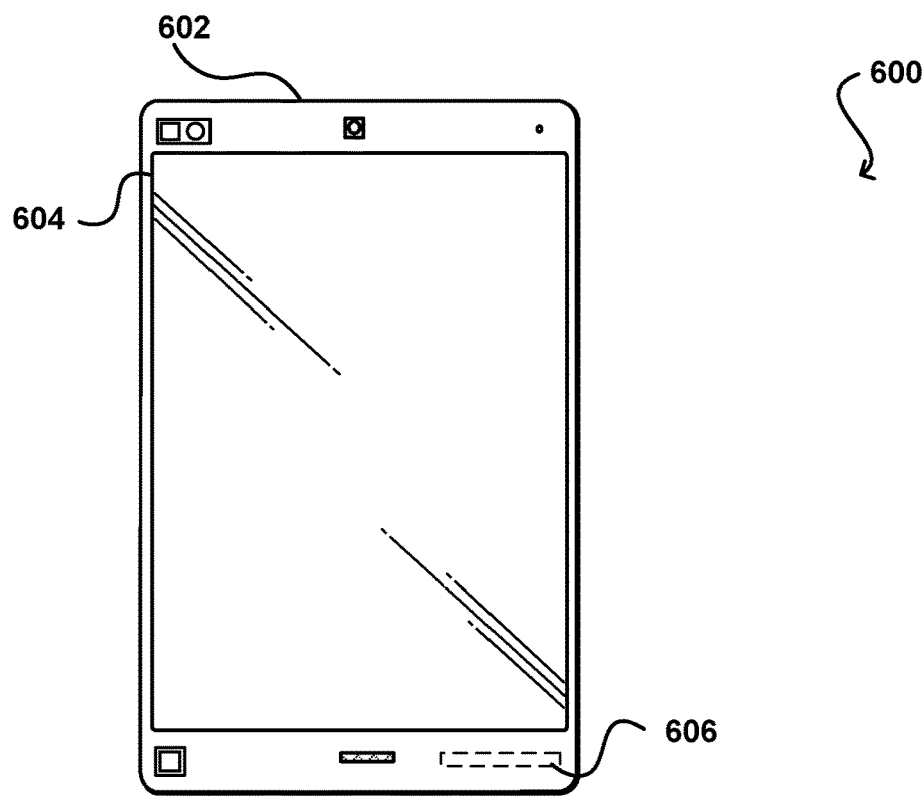
FIGS. 6 and 7 illustrate components of example computing devices which can be utilized to implement aspects of the various embodiments.

As noted herein, and illustrated in FIG. 6, the present systems and methods include the use of electronic computing devices 600, including operator/client devices, which can include any appropriate device operable to send and receive requests, messages, content, image and other data, or other information over an appropriate network and convey information back to a user of the device. While a portable client computing device 600 is illustrated for purposes of this example, it should be emphasized that any of various other types of personal computers and computing devices can be utilized to process and display data and other content as well, as may include a tablet computer, a smart phone, a desktop computer, a notebook computer, a laptop computer, a personal data assistant ("PDA"), a handheld messaging device, a wearable computer (e.g., a smart watch or glasses), and the like. These devices 600 will execute an operating system and be capable of supporting at least one networking protocol and at least one messaging protocol.

In the FIG. 6 example, the computing device 600 has an outer casing 602 and a display screen 604. The display screen 604, under normal operation, will display information to a user (or viewer) facing the display screen (e.g., on the same side of the computing device as the display screen). In line with the disclosure herein, the device can internally include one or more communication components 606, such as may include a cellular communications subsystem, Wi-Fi communications subsystem, Bluetooth® communication subsystem, and the like. Such a device also can be in the form of workstations running any of a variety of commercially-available operating systems and other known applications for purposes such as development and database management. As noted, the networks handling communications can include any appropriate network, such as may include the internet, a LAN, a cellular network, and the like.

Figure 7:
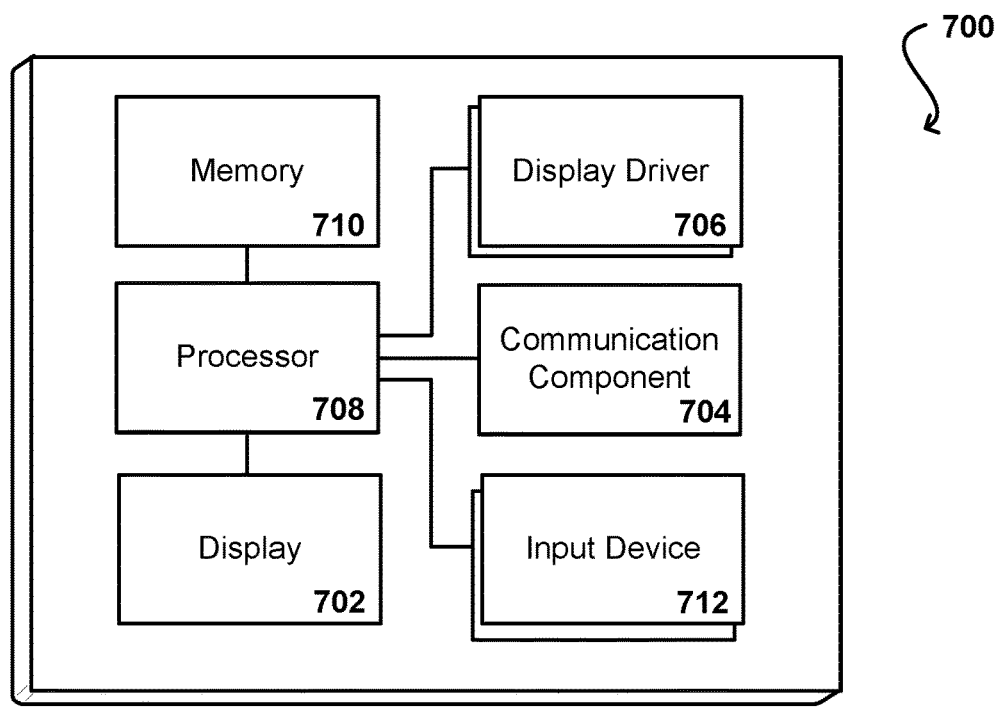

FIG. 7 shows some components of note for a computing device 700, including the client-type device illustrated in FIG. 6, which can be used to apply and perform various embodiments of the present systems and methods, including analysis of image data or communicating a flight path to a drone, among other options. While a sample portable smart device is depicted in FIG. 6, again, the computing device 700 in practice can be any appropriate device able to receive and process commands, content, and other data, such as a personal computer, laptop computer, or smartphone, among others. This example device 700 includes a display element 702, such as a liquid crystal display ("LCD") or a touch-sensitive display screen, for displaying information to a user as known in the art. That said, devices such as portable media players might also convey information via other means, such as through audio speakers. In line with the disclosure herein, the device can internally include one or more communication components 704, such as may include a cellular communications subsystem, Wi-Fi communications subsystem, Bluetooth® communication subsystem, and the like.

The computing device 700 may also include display driver hardware 706 and related image processing capabilities, including one or more image capture elements which could be in the form of, for example, a front-facing camera, a charge-coupled device ("CCD"), a motion detection sensor, or a radiation sensor, among many other possibilities. The example device 700 can also include a microphone or other such audio-capturing device. The device 700 in at least some embodiments can also determine various actions based upon sound detected by the microphone. The device 700 can store, or otherwise have access to, at least one algorithm to process and analyze imagery and other data, as may be stored at least temporarily on the device itself, or it can send the content to be analyzed and otherwise processed by a remote computer or service. Any of a number of algorithms known in the computing art can be used to analyze data, apply rules, enhance performance, and the like. Various other options can be utilized as well as discussed and suggested herein.

In this example, the device 700 further includes one or more processors 708 for executing instructions that can be stored in a memory device or element 710. As known in the art, the device 700 can include many types of memory, data storage, or computer-readable media, such as a first data storage for program instructions for execution by the processor 708, a separate storage for images or data, a removable memory for sharing information with other devices, etc. In some embodiments, the device 700 can include at least one additional input device 712 able to receive conventional input from a user, including that controlling drone operation. This conventional input can include, for example, a push button, touch pad, touch-sensitive element used with a display, wheel, joystick, keyboard, mouse, keypad or any other such device or element whereby a user can input a command to the device 700.

Different components, such as one or multiple display drivers 706, can be used to render or otherwise display different portions of content and related information on a client device. Each device driver 706 can be implemented via hardware and/or software and may include an integrated circuit ("IC") or state machine that accepts commands from a processing component or interface and generates signals useful for displaying the desired content on the relevant portion of the display element(s). In at least some embodiments, a display driver 706 is a semiconductor IC that accepts commands over a general purpose interface, such as I2C, SPI, TTL, or CMOS, and generates signals with the appropriate current, voltage, and other properties for pixels of the appropriate display element. The display driver 706 in some embodiments can include memory, firmware, and other such elements. Factors such as screen size and font size may enable additional or fewer portions of a user interface and other content on the client display 702 to be updated as appropriate.

Various embodiments of the present disclosure can be implemented in a wide variety of operating environments, which, in some cases, include one or more computing devices used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin clients, gaming systems, and other devices capable of communicating via a network.

Again, aspects of the present systems and methods can be implemented as part of at least one Web, cloud, or other service, such as may be part of a service-oriented architecture. Services such as cloud services can communicate using any appropriate type of messaging, using an appropriate protocol known to those of ordinary skill in the art. Processes provided or executed by such services can be written in any appropriate language, and use appropriate data structures and application programming interfaces ("APIs") such as the JavaScript Object Notation ("JSON") data and file interchange format and a Representational State Transfer ("REST") API design.

As noted, most embodiments utilize at least one network that would be familiar to those skilled in the art for supporting communications using any of a variety of commercially-available protocols, such as TCP/IP, FTP, UPnP, NFS, and CIFS. In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including, without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch screen, or keypad), and at least one output device (e.g., a display device, printer, or speaker). The system may also include one or more storage devices, such as disk drives, optical storage devices, and solid-state storage devices such as RAM and/or ROM, as well as removable media devices, memory cards, flash cards, etc.

Such devices also can include a computer-readable storage media reader, a communications device (e.g., a modem, a network card (wireless or wired), an infrared communication device, and the like), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The systems and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as, but not limited to, volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices, or any other non-transitory computer-readable storage medium which can be used to store the desired information and which can be accessed by the a system device. Based on the disclosure and teachings provided herein, a person of ordinary skill in the art will appreciate other ways and/or methods to implement the various embodiments. All of the specification and drawings are, accordingly, to be regarded in an illustrative rather than a restrictive sense. It will be evident that various modifications and changes may be made thereunto without departing from the broader spirit and scope of the invention as set forth in the claims.

What is claimed is:

1. A computer-implemented method, comprising:
capturing, by at least one first camera onboard a first aerial vehicle, first imaging of an area of interest;
capturing, by at least one second camera onboard a second aerial vehicle, second imaging of the area of interest;
determining a disparity between the first imaging and the second imaging, the disparity based on a physical distance between the at least one first camera and the at least one second camera; and
determining the presence of at least one anomaly in the area of interest, based on the disparity, the first imaging, and the second imaging.

2. The computer-implemented method of claim 1, wherein the disparity is determined by determining a distance, the distance based on a perpendicular distance from a surface or subsurface in the area of interest to a point between the at least one first camera and the at least one second camera.

3. The computer-implemented method of claim 1, further comprising:
training at least one neural network using a sample data set, the sample data set including information associated with objects potentially in the area of interest; and
applying, to at least one of the first imaging or the second imaging, the at least one neural network to perform at least one of identification of background objects in the area of interest or pre-processing of the first imaging or the second imaging.

4. The computer-implemented method of claim 1, further comprising:
training at least one neural network using a sample data set, the sample data set including information associated with at least one of surface motion or subsurface motion; and
applying, to at least one of the first imaging or the second imaging, the at least one neural network to identify at least one of surface or subsurface motion in the area of interest.

5. The computer-implemented method of claim 4, further comprising:
training the at least one neural network using a second sample data set, the second sample data set including information associated with aerial vehicle formations; and
applying the at least one neural network to determine a formation for an array of aerial vehicles including the first aerial vehicle and the second aerial vehicle.

6. The computer-implemented method of claim 1, further comprising:
generating, based on the first imaging or the second imaging, a multi-dimensional velocity representation of at least a portion of a surface or a subsurface in the area of interest.

7. The computer-implemented method of claim 1, further comprising:
storing, on a computing element onboard one or more of the first aerial vehicle or the second aerial vehicle, at least a portion of one or more of the first imaging or the second imaging; and
providing, for access by a cloud computing platform, the computing element onboard one or more of the first aerial vehicle or the second aerial vehicle.

8. The computer-implemented method of claim 1, wherein the at least one anomaly is at least one of surface or subsurface movement in the area of interest or a structure.

9. A computer-implemented surveying system, comprising:
at least one processor;
a first aerial vehicle;
a second aerial vehicle; and
a memory device including instructions that, when executed by the at least one processor, cause the monitoring system to:
capture, by at least one first camera onboard a first aerial vehicle, first imaging of an area of interest;
capture, by at least one second camera onboard a second aerial vehicle, second imaging of the area of interest;
determine a disparity between the first imaging and the second imaging, the difference based on a physical distance between the at least one first camera and the at least one second camera; and
determine the presence of at least one anomaly in the area of interest, based on the disparity, the first imaging, and the second imaging.

10. The computer-implemented surveying system of claim 9, wherein the first aerial vehicle and the second aerial vehicle are unmanned.

11. The computer-implemented surveying system of claim 9, wherein the instructions, when executed by the at least one processor, further cause the monitoring system to:

determine, using a satellite positioning system or another positioning protocol, one or more positions of at least one of the first aerial vehicle or the second aerial vehicle;

determine, based on the one or more positions, motion of the at least one of the first aerial vehicle or the second aerial vehicle; and generate, based on the motion of the at least one of the first aerial vehicle or the second aerial vehicle, an updated representation of the disparity.

12. The computer-implemented surveying system of claim 11, wherein one of the first aerial vehicle or the second aerial vehicle performs at least one of computation, storage, or position coordination for aerial vehicles in an array.

13. The computer-implemented surveying system of claim 9, wherein at least one of the first aerial vehicle or the second aerial vehicle includes a laser or other targeted beam generally focused on the area of interest, and wherein the instructions, when executed by the at least one processor, further cause the monitoring system to:

update the area of interest based on one or more markers provided by the laser or other targeted beam.

14. The computer-implemented surveying system of claim 9, wherein the a representation of the disparity is defined, at least in part, by the equation d=fb/Z, with (d) representing the disparity, (f) representing respective focal lengths of the at least one first camera and the at least one second camera, (b) representing a physical distance between the at least one first camera and the at least one second camera, and (Z) representing a perpendicular distance from a point between the at least one first camera and the at least one second camera to a surface or subsurface point in the area of interest.

15. The computer-implemented surveying system of claim 9, wherein the instructions, when executed by the at least one processor, further cause the monitoring system to:

generate report data including one or more patterns of motion in the area of interest or one or more unexpected occurrences in the area of interest; and provide, for access by a computing device, the report data.

16. The computer-implemented surveying system of claim 9, wherein the instructions, when executed by the at least one processor, further cause the monitoring system to:

apply, to at least one of the first imaging or the second imaging, a trained neural network to identify and classify at least one of motion or an object in the area of interest.

17. A computer-implemented method, comprising:

capturing, by at least one first camera onboard a first unmanned aerial vehicle of a fleet of aerial vehicles, first image data of an area of interest;

capturing, by at least one second camera onboard a second unmanned aerial vehicle of the fleet, second image data of the area of interest;

generating a representation of a distance disparity between the first image data and the second image data, the distance disparity based on a distance between the at least one first camera and the at least one second camera;

determining based on the distance disparity and the first image data and the second image data, the presence of at least one seismic event or a physical structure in the area of interest; and providing an automated notification of the presence of the at least one seismic event or the physical structure.

18. The computer-implemented method of claim 17, further comprising:

analyzing at least a portion of the first image data or the second image data to identify, based on a predetermined confidence level, a movement, or an object in the area of interest.

19. The computer-implemented method of claim 17, further comprising:

generating at least one of a linear two-dimensional (2-D) seismic image of the area of interest, a three-dimensional (3-D) volume-type image of the area of interest, or a four-dimensional (4-D) volume-type image of the area of interest.

20. The computer-implemented method of claim 17, further comprising:

transmitting a live video stream of the area of interest, based on one or more of the first image data or the second image data.

\* \* \* \* \*